United States Patent [19]

Quermann

[11] 4,143,466

[45] Mar. 13, 1979

[54] FREE FLOATING GYROSCOPIC COMPASS AZIMUTH PICK-OFF AND ROTOR DRIVE SYSTEM

[75] Inventor: Thomas R. Quermann, Huntington Station, N.Y.

[73] Assignee: Sperry Rand Corporation, New York, N.Y.

[21] Appl. No.: 776,058

[22] Filed: Mar. 9, 1977

[51] Int. Cl.² .............................................. G01C 19/28

[52] U.S. Cl. ....................................... 33/327; 33/318; 74/5.6 D

[58] Field of Search ................. 33/327, 317 R, 317 D, 33/346, 364, 318, 324; 74/5.6 C, 5.6 D, 5.6 A, 5.6 B, 5.6 R

[56] References Cited

U.S. PATENT DOCUMENTS

| | | | |
|---|---|---|---|
| 3,226,984 | 1/1966 | Humphrey | 74/5.6 C |
| 3,373,617 | 3/1968 | Lassig | 33/327 X |
| 3,811,328 | 5/1974 | Rodgers et al. | 74/5.6 B |
| 3,915,019 | 10/1975 | Zoltan | 74/5.6 A |

*Primary Examiner*—William D. Martin, Jr.
*Attorney, Agent, or Firm*—Howard P. Terry

[57] ABSTRACT

An azimuth directional synchro output is provided for a gyroscopic compass, the compass consisting of a pendulous gyrosphere floating within a spherical cavity containing an electrically conductive fluid. By forming one electrode that carries power through the fluid to spin the gyroscope rotor as a band of sinusoidally varying width, four cooperating electrodes equally spaced about the instrument case supply azimuth position data to excite a selsyn data transmitter system. The currents collected by the four cooperating electrodes are proportional to the varying resistances of the respective fluid paths. They generate a vector field within the selsyn system which establishes outputs representing true azimuth bearing within the three selsyn output leads.

13 Claims, 4 Drawing Figures

FREE FLOATING GYROSCOPIC COMPASS AZIMUTH PICK-OFF AND ROTOR DRIVE SYSTEM

BACKGROUND OF THE INVENTION

1. Field of the Invention

The invention generally relates to the field of gyroscopic instruments and is more particularly concerned with floated gyrocompass instruments of the kind employed in marine navigation.

2. Description of the Prior Art

Among available types of marine gyrocompasses, instruments having a neutrally buoyant, pendulous spherical shell enclosing one or more gyroscopic rotors driven by electrical power transmitted into the spherical shell through an electrically conductive flotation fluid have been used with some success for several years. Normally, these gyrocompasses additionally include electrodes so disposed that departure of the floated spherical shell from a fixed azimuth orientation with respect to an inner housing of the instrument is sensed. However, the nature of the sensor and of its application necessitate that it be used in conjunction with a servo system for responding to a sensed error by repositioning the gyroscope inner housing element to null the sensor output. The position of the inner housing with respect to the outer case of the instrument is then transmitted by conventional means such as a synchro data transmitter system to provide an electrical read out of the azimuth value determined by the gyrocompass. The requirement of the inner housing and its associated servo undesirably adds to the size, weight, and cost of the instrument and also significantly reduces its reliability.

SUMMARY OF THE INVENTION

The present invention concerns improvements in gyroscopic compasses of the kind providing directional data over a full 360° in azimuth and including a pendulous hollow gyrosphere floated within a spherical cavity by an electrically conductive fluid. One of the electrodes normally used to convey electrical power through the flotation fluid for spinning the gyroscope rotor is specially shaped as an equatorial band of width varying sinusoidally with position about the gyrosphere. Four cooperating electrodes equally spaced about the instrument case directly supply azimuth positional data to excite a selsyn or related data transmitter device, the variable magnitude currents collected by the four cooperating electrodes being proportional to the respective varying resistances of the respective conductive fluid paths through the electrolytic flotation fluid. These several currents are used to generate three-wire selsyn data representing the true azimuth bearing detected by the novel instrument. The plurality of cooperating electrodes and the sinusoidally shaped electrode on the gyrosphere operate both to supply power to drive the gyroscope rotor system and also generate pick-off signals compatible with conventional synchro data transmission requirements directly from the position of the gyrosphere within the instrument outer case. This eliminates the need for the formerly used servo mechanism and its associated parts and results in a significant reduction in cost and an increase in reliability.

DESCRIPTION OF THE PREFERRED EMBODIMENTS

Figure 1:
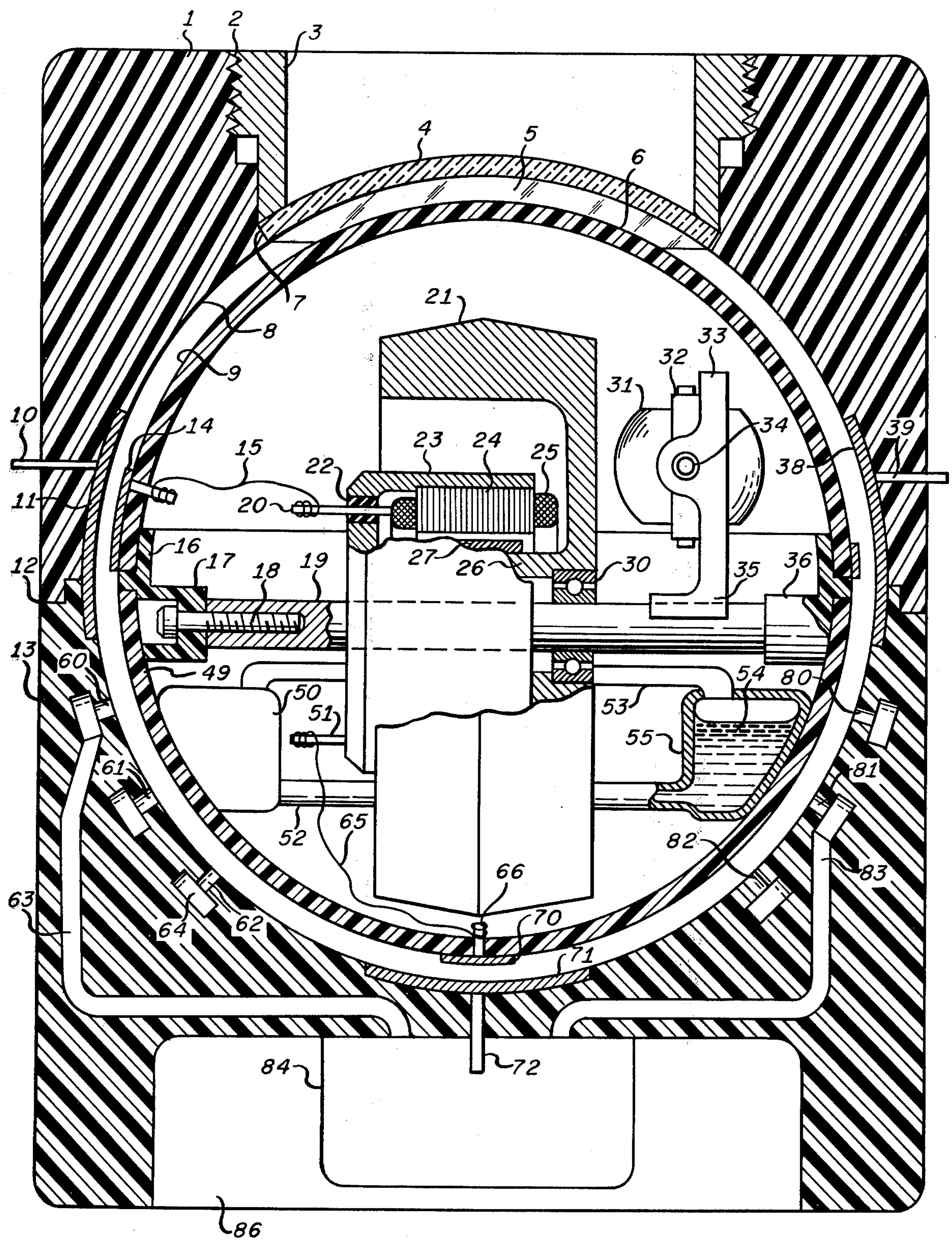
FIG. 1 is an elevation view, largely in cross-section, of a preferred form of the invention.

In FIG. 1, it is seen that the novel gyroscopic pick-off and suspension system includes a fully free floated sensitive unit residing within a hollow spherical floated gyrosphere element including a pair of electrically insulating hemispheric shells 6 and 49 fastened together hermetically by an annular joining member 16 disposed substantially at an equator of the outer spherical surface 9. The spherical outer surface 9 is supported within a conformal inner spherical surface 8 formed within the outer case of the instrument, the case including an upper case portion 1 and a lower case portion 13 sealed or otherwise hermetically joined at the annular joint 12. In this manner, the conformal spherical surfaces 8 and 9 form a gap 5 of substantially constant width which is the locus of a thin film of fluid for supporting the spherical shell or container 6, 49 and the gyroscopic apparatus it contains. The upper case portion 1 may be provided with a viewing window 4 whose interior surface matches the curvature of surface 8. Window 4 is held in position against annular seat 7 by a retainer ring or tube 3 having a threaded portion 2 matching cooperating threads in the upper case portion 1. If a directly viewable indication of direction is desired, a compass rose (not shown) may be supplied on the upper polar part of spherical surface 9 to be viewed with respect to a suitable index (not shown) scribed on a surface of window 4. It will be understood by those skilled in the art that the width of gap 5 as shown in FIG. 1 is chosen simply to make the drawing clear, and that the width of gap 5 and other dimension and proportions shown in the drawings are similarly not necessarily those that would be selected by the expert practitioner.

Figure 2:
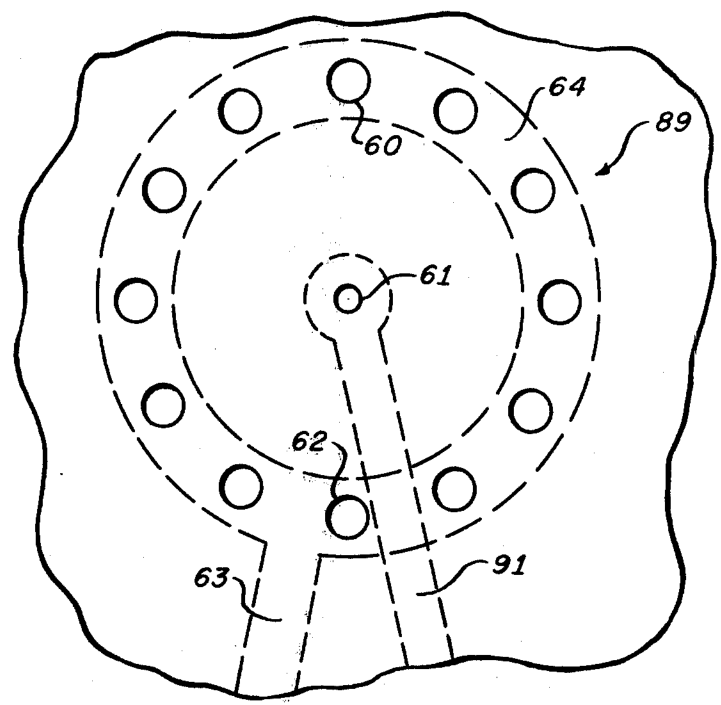
FIG. 2 is a fragmentary view of one of the fluid pressure support pads seen in the lower portion of FIG. 1.

The spherical rotor-bearing shell 6, 49, with the primary gyroscope rotor 21 and the other parts that it contains, is designed to have a mean density equal to that of the supporting fluid within gap 5, so that it is buoyantly supported in substantially neutral equilibrium by the fluid. Further, the spherical rotor-bearing shell or container 6, 49 may be maintained with a gap 5 of normally uniform width of, for example, 0.01 inches between it and the adjacent conformal surface 8 by a conventional sphere-centering and supporting arrangement. Fluid pressure pad systems such as illustrated in FIGS. 1 and 2 may be employed for this latter purpose.

In FIG. 1, the fluid pump 84, which may be a conventional diaphragm or other fluid pump, provides a constant flow of the support fluid to the several pressure pads, such as through input channel 83, the fluid being withdrawn from the volume provided by gap 5, for example, via an exhaust channel 63 for continuous recirculation by pump 84. FIG. 2 illustrates on a slightly different scale, one such pressure pad device in which an input channel 91 provided by a bore in lower case portion 13 supplies support fluid through a central constriction 61. Surrounding central constriction 61 is a circular array 89 of relatively open apertures such as at 60 and 62 for collecting the fluid in a circular manifold 64 for return to pump 84 via exhaust channel 63. It will be understood that channels 64, 91 are not connected in the drawing, but lie in separate planes spaced below the plane of the drawing. FIG. 1 illustrates the use of a pair of diametrically opposed pads disposed in the lower case portion 13. It will be understood that a similar second pair of diametrically opposed pressure pad devices will normally be found in the upper case portion 1; these are normally oriented symmetrically in a plane at right angles to the plane of FIG. 1 and including the vertical axis of the drawing.

The action of the flotation fluid when flowing into the pressure pads is to keep the rotor-bearing shell 6, 49 centralized within spherical surface 8. As previously observed, the rotor-bearing shell 6, 49 is balanced by flotation forces which themselves tend to support that shell and substantially to compensate for gravity and acceleration forces acting upon it. However, small residual forces and accelerations are generally present which might induce accumulative relative translation between the rotor-bearing shell, 6, 49 and the conformal surface 8 when the instrument is subjected to translation, thus causing gap 5 to become non-uniform. When such deviations occur, the gap 5 at the several pads suffers variations, tending to produce pressure changes in the volumes immediately above each constricted outlet 61, which pressure changes, in turn, desirably reposition the rotor-bearing spherical shell 6, 49 in a compensatory manner. Accordingly, the centralizing pressure pad system maintains the shell 6, 49 at a normal, uniform distance from spherical surface 8 about the axes of freedom of shell 6, 49, while additionally providing a continuous flow of supporting fluid between the inputs and outputs of each pressure pad.

The invention may equally well use other pressure pad fluid support arrangement well known in the art, such as the support and centering systems of any of the following United States patents assigned to Sperry Rand Corporation:

- V. Vacquier — U.S. Pat. No. 2,835,132 — "Gyro Verticals", issued May 20, 1958,
- H. B. Sedgfield — U.S. Pat. No. 2,913,907 — 37 Gyroscopic Apparatus", issued Nov. 24, 1959,
- G. J. Watt — U.S. Pat. No. 3,252,340 — "Gyroscopic Apparatus", issued May 24, 1966, or
- A. Polushkin et al — U.S. Pat. No. 3,347,105 — "Gyroscopic Apparatus", issued Oct. 17, 1967.

A representative primary gyroscope and control system within spherical shell 6, 49 is illustrated in FIG. 1 as supported upon the annular joining member 16 of that shell. In particular, it includes a shaft 19 fastened between opposite bosses 17, 36, which may be integral with the joining member 16, as by bolts 18. Supported directly from the non-rotating shaft 19 is an electric motor stator cage 23 internally supporting stator 24 and a stator excitation winding 25. Winding 25 is provided with excitation terminals, such as terminals 20, 51, each of which passes through electrical insulators such as seen at 22, thereby extending through the end wall of cage 23. The primary gyroscope rotor 21 has an axially disposed hollow rotatable shaft 26 mounted on a pair of bearing races, such as bearing 30, spaced apart on non-rotating shaft 19. A hysteresis ring 27 mounted on shaft 26 forms the rotor of the driving motor. This motor may be operated from the single phase power by means of a phase splitting capacitor (not shown).

The configuration has the further advantage that stabilizing and ballistic elements may readily be located within spherical shell 6, 49. A generally conventional liquid ballistic, such as shown in the W. R. Keyser U.S. Pat. No. 2,990,623, issued July 4, 1961 for a "Self-Clearing Liquid Ballistic for Gyro Assembly" and assigned to Sperry Rand Corporation and formed in the manner of a closed loop may be used in the usual way to impart a meridian seeking property to the gyroscope. Such a ballistic element consists of first and second reservoirs 50, 55 secured to the interior of spherical shell 6, 49 and partially filled with a liquid 54 such as a commercially available fluorocarbon fluid. In the neutral position of the instrument, the liquid 54 also fills a tube 52 connecting the bottoms of reservoirs 50, 55. A gas duct 53 connects the tops of the reservoirs 50, 55 to provide for free passage of a gas such as air between the reservoirs when the floated gyroscopic system tilts. Stabilization of the floated system is effected in a generally conventional manner by a small rate gyroscope supported at the base 35 of a yoke 33 upon shaft 19. Rate gyroscope rotor 31 is journalled in bearings about a normally vertical axis in gimbal 32, gimbal 32 being journalled for rotation about a normally horizontal axis by bearings mounted in yoke 33, such as the bearing at 34. In the usual manner, a spring restraint (not shown) is provided between gimbal 32 and yoke 33 so as to restrain the rotation of gimbal 32 with respect to yoke 33, this action providing in a conventional manner the usual corrective stabilizing forces upon the floated system. The apparatus within spherical shell 6, 49 is arranged so that the assembly is somewhat pendulous.

As so far described, it is seen that the sensitive element associated with the spherical shell 6, 49 is free of all undesired restraints and may be relied upon to indicate direction with respect to north with great precision. It is still required, however, to introduce electrical power for driving gyroscopic rotors 21 and 31 and to extract from spherical shell 6, 49 in the form of useful electrical signals data defining its orientation with respect to the outer case 1, 13. In particular, it is desired to provide paths for power and for these electrical data signals without disturbing or coercing the floated sensitive element when in operation and also to achieve the desired end result without introducing complexity, such as the aforementioned servo driven intermediate housing for the sensitive element and its attendant complications. For this purpose, the present invention as seen in FIG. 1 and more particularly in FIGS. 3 and 4 employs a system of electrodes and makes cooperative use of an electrolytic suspension fluid within gap 5 for the purpose of conveying electrical currents through the electrolyte between such electrodes. The unique electrode system of the present invention and the circuit cooperating therewith thus in an integrated configuration solve two problems, that of driving the gyroscope motors from an external alternating current power source 114 (FIG. 4) and that of deriving data with respect to the azimuth position of the spherical shell surface 9 with reference to the position of outer casing 1, 13 and of supplying such data to an external utilization device 136 in suitable form.

Figure 3:
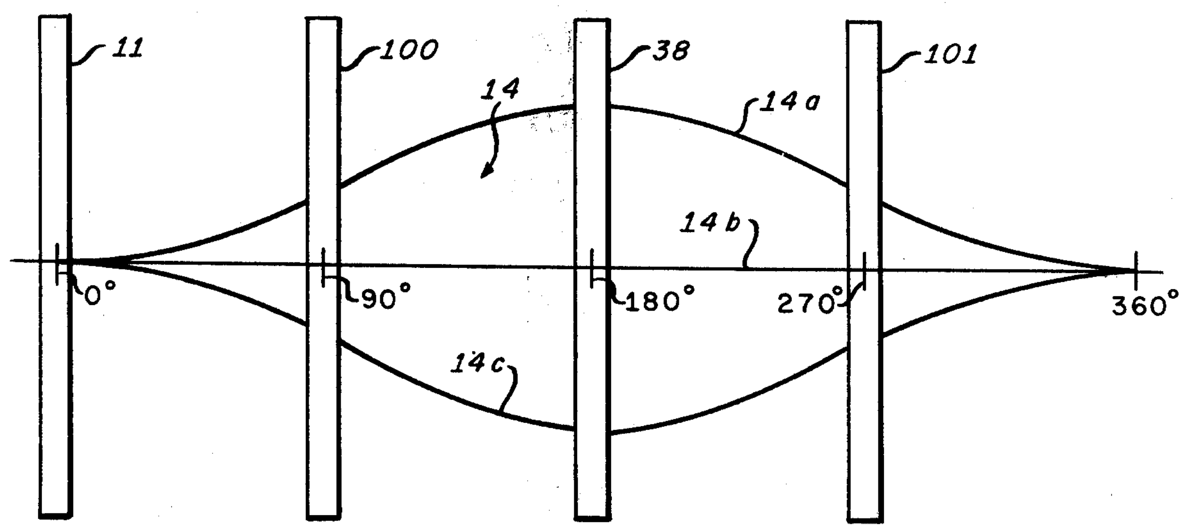
FIG. 3 is a developed view of the electrodes employed in FIG. 1.
Figure 4:
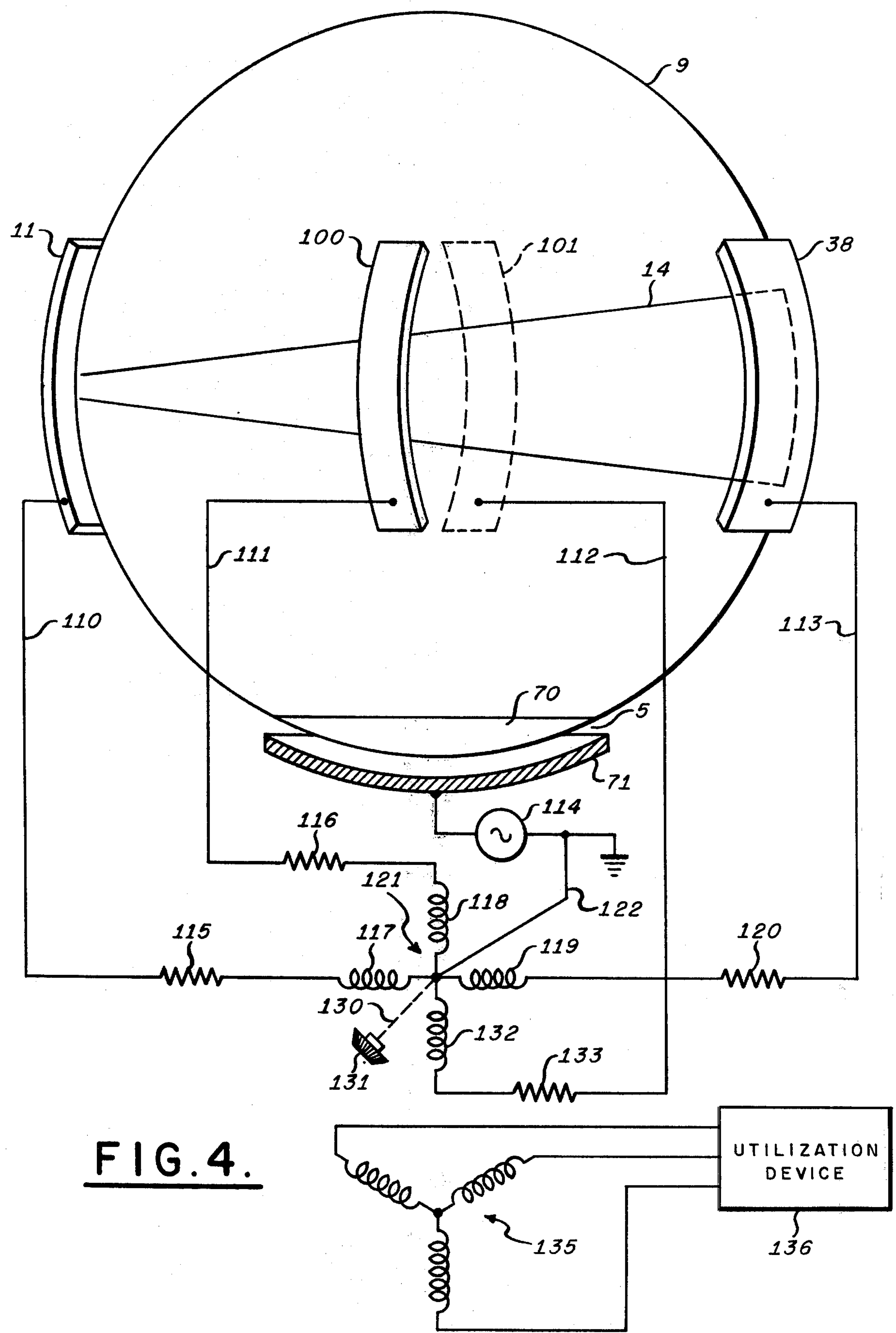
FIG. 4 is a fragmentary elevation view of the gyrosphere and of its associated electrodes, together with a wiring diagram showing the electrical connections and components of the rotor driving and pick-off system of the invention.

Referring to FIGS. 3 and 4, the spherical shell surface 9 is provided with a symmetric polar electrode 70 which functions to inject electrical current from source 114 into shell 6, 49 for both purposes. This comes about by coupling the source 114 to ground and to a polar electrode 71 located on or inlaid in surface 8 opposite polar electrode 70 so that the current flows between electrodes 70 and 71 through the fluid electrolyte in gap 5. This current flows, as seen in FIG. 1, via terminal 66, lead 65, terminal 51, motor winding 25, terminal 20 and lead 15 to the terminal of an annular electrode 14 extending fully around an equatorial region of surface 9 of spherical shell 6, 49. Electrode 14 has a shape such as shown in FIG. 3 for purposes yet to be explained. The current transit across the electrolyte in gap 5 is made a second time by the use of four equally-spaced electrodes 11, 100, 38, 101 spaced about annular shaped electrode 14 along meridian lines of spherical surface. Each of the electrodes 11, 100, 38, 101 is a vertically oriented electrically conducting strip secured to or inlaid just within the spherical surface 8. Currents flowing into electrodes 11, 100, 38, 101 pass through the respective leads 110, 111, 113, and 112 and add at the common junction of the selsyn-like inductive device 121 to be returned by lead 122 to the grounded side of source 114. In normal operation of the apparatus, surface 9 is substantially centered within surface 8, so that independent of the azimuth position of spherical surface 9 with respect to electrodes 11, 100, 38, 101, a substantially constant total current flow passes through the electrical loop, and the gyroscope rotors are consequently driven by a substantially constant drive voltage when in steady state operation.

In order to provide the desired azimuth positional data at utilization device 136, selsyn-like device 121 and its associated circuits play a special role. For example, pick off electrode 11 is coupled via lead 110 through the trimming resistor 115, which may be adjustable, to one coil 117 of the selsyn-like inductive device 121. Three analogous cooperating circuits include pick off electrodes 100, 38, 101, leads 111, 113, 112, resistors 116, 120, 133 and selsyn coils 118, 119, 132.

It will be seen that the distribution between pick off electrodes 11, 100, 38, 101 of the total current flowing from source 114 is determined by the shape of annular electrode 14 and its azimuthal position. As seen in FIG. 4 for one representative azimuth position of surface 9, the annular electrode 14 happens to have its narrowest portion opposite pick off electrode 11, while its widest portion is opposite pick off electrode 38. Pick off electrodes 100, 101 lie opposite intermediate and equal width portions of annular electrode 14. As spherical surface 9 rotates with respect to spherical surface 8, it will readily be seen that the current amplitudes flowing out of pick off electrodes 11, 100, 38, 101 vary cyclically in 90° phased relation in such a manner that they generate corresponding cyclically varying fields in the respective inductive selsyn coils 117, 118, 119, 132. Selsyn-like inductive device 121 being of the conventional transolver type, a rotatable magnetic field vector is generated by the cooperation of coils 117, 118, 119, 132, whose direction is representative of the instantaneous azimuth position of surface 9. It will be understood that the transolver selsyn device 121 may be a conventional selsyn device of the kind having two center-tapped rotor input windings as found in ordinary differential resolvers and the two or three-winding stator of an ordinary resolver or synchro. A manual latitude heading-error adjustment may be applied by knob 131 through mechanical link 130. In this manner, the actual azimuth orientation of surface 9 may be transferred by the wie-connected selsyn coils 135 as three-wire selsyn data to any utilization device 136.

To provide substantially constant current flow, as between polar electrodes 70, 71, electrode 71 will usually be made larger than electrode 70; thus, when spherical shell 6, 49 suffers relative tilt, the active cooperating areas of conduction for this electrode pair remains substantially constant over a correspondingly wide range of tilt. Again for affording operation generally independent of tilt, the several pick off strip electrodes 11, 100, 38, 101 are substantially longer than the maximum width of annular shaped electrode 14. Thus, the power-supplying and azimuth pick off functions of the novel electrode configuration remain reliably constant even when the outer instrument casing 1, 13 is tilted considerably off vertical, as will happen during shipboard operation of a gyroscopic compass.

For providing the desired output of transolver device 121, the annular electrode 14 has a width at any point that is a constant plus a second constant equal to or less than the first constant times the sine of the longitudinal position of the point on the annular electrode 14 in question. Such an electrode will appear to have straight sides when placed on spherical surface 9 and if then viewed as it appears in FIG. 4. On the other hand, a developed view of electrode 9 will have the sinusoidal appearance shown in FIG. 3. It is then seen to consist of a symmetric electrode 14 in which two sides 14*a*, 14*c* are co-phasally sinusoidal; side 14*c* may be replaced by a straight side 14*b*. It will be understood by those skilled in the art that electrode sizes, the width of gap 5, and the supporting fluid conductivity are proportioned relative to the selected gyroscope motor and transolver selsyn input impedances so that the magnitude of the current flowing in a given coil of coils 117, 118, 119, 132 is significantly influenced by the effective area of overlap of the pick off electrode under consideration and the annular shaped electrode 14.

In the further interest of providing an instrument inexpensive of manufacture, major parts of the gyrocompass are made of selected non-porous injection molded plastic materials compatible with the electrolytic suspension fluid employed and demonstrating essentially constant physical properties between, for example, −78° C. and +100° C. High electrical resistivity is also desirable and is found in plastic materials readily available in the market. Among useful materials found directly to support the required plated metallic electrodes (sputtered or otherwise formed) are mineral or glass re-enforced diallyl phthalate or mineral or glass re-enforced epoxy resins. Hermetic seals required at 12 and 16 in FIG. 1 are readily made using epoxy or other related adhesives. While other electrolytic fluids may readily be used, the flotation fluid may, for example, be a known ethanol-water mixture to which potassium iodide is added to provide the desired conductivity, at least 55 percent by weight of the formula being ethanol if freezing above −40° Centigrade is to be avoided. A trace of sodium tetraborate may be added for pH control. The nature of the flotation fluid, especially as to its density, will depend greatly on the characteristics of the floated sphere and the aforementioned fluid is merely mentioned by way of providing an example of one fluid composition of which many are known to provide a wide range of useful characteristics.

Accordingly, it is seen that the invention provides a versatile floated gyrocompass system in which the added expense and complications of a servo-driven inner housing are eliminated by the beneficial use of a novel electrolytic pick off system which not only provides a full 360° azimuth read out for the instrument, but also readily supplies the necessary drive power to gyroscope rotors contained in the gyrosphere. The electrode system provides a torque-free read out of the true azimuth data conveniently in selsyn data transmission form of the relative position of the gyrosphere with respect to the instrument case about one axis, the read out precision being substantially independent of displacements over a significant range of the instrument outer case about orthogonal axes. In addition, the invention provides decreased original and maintenance costs and improved reliability with respect to the aforementioned prior art compasses. In addition, the invention is readily useful with non-spherical floated elements, including the circular cylindric elements found useful in gyroscopic land compasses.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. A gyroscopic instrument comprising:
- outer casing means having spherical interior surface means for forming inner cavity means with at least a first polar region and a first equatorial region,
- gyroscope container means having exterior spherical surface means conformal with said spherical interior surface means for forming continuous gap means therebetween and having at least a second polar region and a second equatorial region,
- gyroscopic rotor means disposed within said gyroscope container means for rendering same pendulous and normally maintaining said first and second polar regions in overlapping relation,
- electrically conductive flotation fluid means disposed within said continuous gap means,
- first electrode means disposed on said spherical interior surface means at said first equatorial region,
- second electrode means disposed on said spherical exterior surface means at said second equatorial region in cooperative current conducting relation with said first electrode means and said electrically conductive flotation fluid means,
- coupling means at said first and second polar regions for cooperatively coupling electrical current across said continuous gap means to said second electrode means,
- said first electrode means comprising a plurality of equally spaced discrete electrode portions,
- said second electrode means extending continuously about said spherical exterior surface means and having a width varying between a minimum and a maximum value as one cycle of a sinusoidal function of the equatorial azimuth angle from said minimum width value, and
- inductive means responsive to the relative magnitudes of the several currents flowing between said first and second electrode means for generating output currents representative of the relative azimuth positions of said gyroscope container means and said outer casing means.

2. Apparatus as described in claim 1 wherein:
- said coupling means comprises first circular electrode means at said first polar region and second circular electrode means at said second polar region in cooperative current carrying relation with said electrically conductive flotation fluid means,
- said first circular electrode means being significantly larger in diameter than said second circular electrode means.

3. Apparatus as described in claim 1 wherein said width at each successive longitudinal angular location on said second electrode means varies as a function of a first predetermined constant plus a second predetermined constant multiplied by the sine of the angle of said longitudinal angular location.

4. Apparatus as described in claim 1 wherein one edge of said second electrode means falls on a latitude line of said exterior spherical surface means.

5. Apparatus as described in claim 1 wherein said spaced discrete electrode portions each comprise equally-spaced elongate electrode means each having a long dimension lying along a respective longitude of said exterior spherical surface means.

6. Apparatus as described in claim 5 wherein said long dimension is substantially greater than said maximum value.

7. Apparatus as described in claim 5 wherein said inductive means comprises:
- first multiple winding means having four input means,
- second multiple winding means having three output means, and
- selector means for adjusting the relative angular positions of said first and second multiple winding means according to earth's latitude.

8. Apparatus as described in claim 7 wherein the multiple windings of said first and second multiple winding means are respectively coupled to first and second common junction means.

9. Apparatus as described in claim 8 further including:
- alternating current source means coupled between said coupling means and said first common junction means,
- said multiple windings of said first multiple winding means each being coupled to a respective one of said respective elongate electrode means.

10. Apparatus as described in claim 9 additionally including trimming resistor means coupled in series between each of said multiple windings of first multiple winding means and said respective elongate electrode means.

11. Apparatus as described in claim 7 wherein said second multiple winding means has three output means adapted to provide three-wire position data to utilization means.

12. Apparatus as described in claim 1 wherein said gyroscopic rotor means includes rotor driving stator winding means in series relation with said coupling means and said second electrode means.

13. Apparatus as described in claim 1 wherein said outer casing means includes hydraulic means cooperatively coupled to said continuous gap means whereby said electrically conductive flotation fluid is continuously circulated for maintaining the width of said gap means substantially constant.

* * * * *